United States Patent [19]

Liu

[11] Patent Number: 5,511,861
[45] Date of Patent: Apr. 30, 1996

[54] INTERMITTENTLY BRAKING APPARATUS FOR ANTI-LOCKING PURPOSE

[76] Inventor: Shiu-Yen Liu, P.O. Box 55-47, Taipei, Taiwan

[21] Appl. No.: 370,196

[22] Filed: Jan. 9, 1995

[51] Int. Cl.[6] ............................... B60T 15/58; B60T 8/48
[52] U.S. Cl. ........................ 303/113.1; 188/85; 303/61; 303/87; 303/115.1; 303/116.4
[58] Field of Search ..................... 303/113.1, 10–12, 303/61–63, 113.2, 116.3, 116.4, 6.01, 87, 115.1, 115.2, 113.5, 84.1, 84.2; 188/162, 181 R, 2 R, 152, 290, 296, 297, 293, 355, 358, 359, 360, 85

[56] References Cited

U.S. PATENT DOCUMENTS

| 2,815,098 | 12/1957 | Olving | 188/358 |
|---|---|---|---|
| 2,821,267 | 1/1958 | Olving | 188/85 |
| 3,361,487 | 1/1968 | Vriend | 188/85 X |
| 3,731,979 | 5/1973 | Mikaila | 303/61 X |
| 4,201,422 | 5/1980 | Depas, Sr. | 303/10 |
| 4,568,131 | 2/1986 | Blomberg et al. | 303/61 |
| 4,755,007 | 7/1988 | Mollat | 303/61 |
| 4,962,972 | 10/1990 | Pizzo | 303/61 X |

FOREIGN PATENT DOCUMENTS

| 4362455 | 12/1992 | Japan | 303/113.1 |

Primary Examiner—Douglas C. Butler

[57] ABSTRACT

A braking apparatus includes: a multi-pass rotary valve and an expansion-cylinder mounted in between a brake master cylinder and a plurality of wheel cylinders provided on the front wheels and the rear wheels, whereby upon treading of a brake pedal of a vehicle braking system and upon rotation of a rotor in the multi-pass rotary valve to alternatively flow a hydraulic oil towards the wheels cylinders and towards the expansion-cylinder to intermittently the vehicle wheels without locking the wheels for anti-locking safety purpose.

3 Claims, 4 Drawing Sheets

5,511,861

INTERMITTENTLY BRAKING APPARATUS FOR ANTI-LOCKING PURPOSE

BACKGROUND OF THE INVENTION

In operating a conventional car brake system in case of emergency situation, a car driver may immediately tread the brake pedal at a great force, trying to stop the car right away. However, the output pressure of the brake hydraulic oil is very high, thereby suddenly locking the car wheels. Even the car wheels are locked, the great force of inertia of a car under high running speed may still cause slipping of the car or even turn over the car, possibly causing a serious traffic accident or injury especially on a rainy or snowy day.

The present inventor has found such phenomena and invented the present vehicle brake apparatus having means for preventing the locking of brake car wheels.

SUMMARY OF THE INVENTION

The object of the present invention is to provide a braking apparatus including: a multi-pass rotary valve and an expansion-cylinder mounted in between a brake master cylinder and a plurality of wheels cylinders provided on the front wheels and the rear wheels, whereby upon treading of a brake of a vehicle braking system and upon rotation of a rotor in the multi-pass rotary valve to alternatively flow a hydraulic oil towards the wheels cylinders and towards the expansion-cylinder to intermittently brake the vehicle wheels without locking the wheels for anti-locking safety purpose.

DETAILED DESCRIPTION

Figure 1:
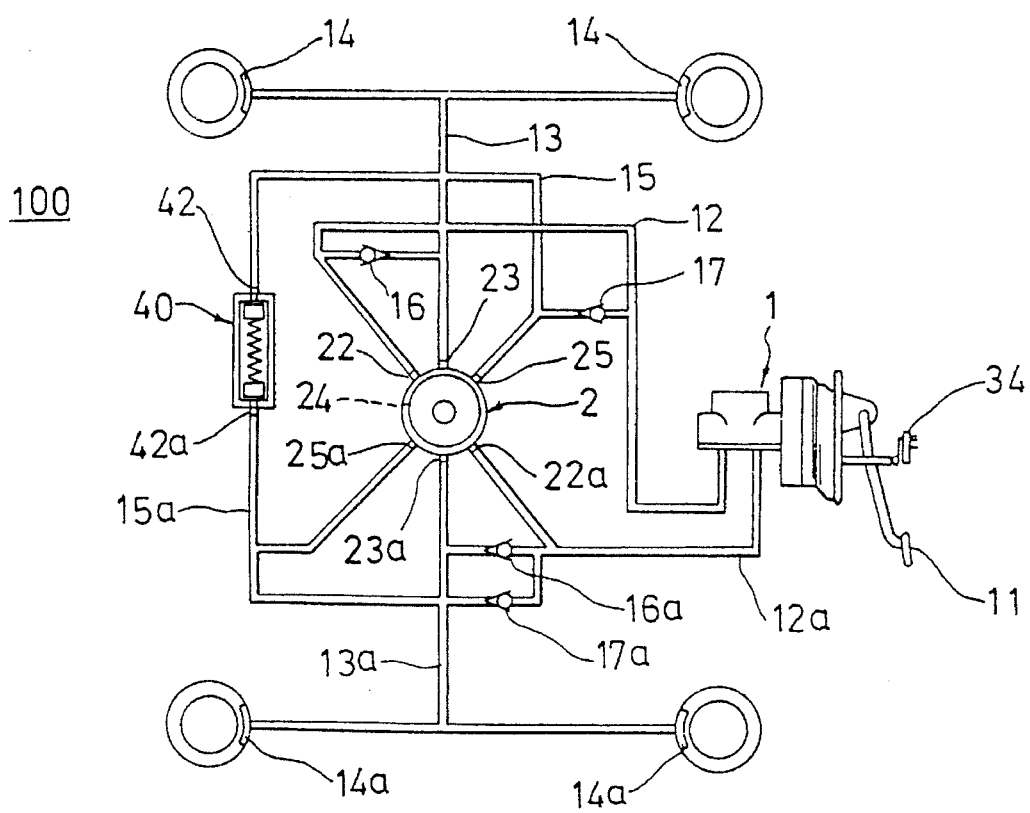
FIG. 1 is an illustration showing a braking system of the present invention.

As shown in FIG. 1–10, the present invention comprises: a braking system 100 including a brake master cylinder 1, a multi-pass rotary valve 2 and an expansion-cylinder 40 provided in between the brake master cylinder 1 and a plurality of front and rear wheels cylinder 14, 14a secured to at least a pair of front wheels and at least a pair of rear wheels, at least a first hydraulic oil delivery conduit 12 connected between the master cylinder 1 and the multi-pass rotary valve 2 for delivery hydraulic oil from the master cylinder 1 into the valve 2 upon treading of a brake pedal 11 for an end braking use of the front wheels and at least a second hydraulic oil delivery conduit 12a connected between the master cylinder 1 and the multi-pass rotary valve 2 for delivering hydraulic oil from the master cylinder 1 into the valve 2 for an end use of the rear wheels, at least a first and a second hydraulic oil distributing conduit 13, 13a respectively connected between the valve 2 and the front and the rear wheel cylinders 14, 14a for delivering the hydraulic oil into the front and rear wheel cylinders 14, 14a for braking the front and the rear wheels, at least a first and a second hydraulic oil returning conduit 15,15a respectively connected between the valve 2 and the expansion-cylinder 40 for returning the hydraulic oil from the valve 2 into the expansion-cylinder 40, at least a first and a second restoring check valve 17, 17a each check valve 17 or 17a provided in between each hydraulic oil returning conduit 15 or 15a and each hydraulic oil delivery conduit 12 or 12a for returning the hydraulic oil from the expansion-cylinder 40 into the master cylinder 1, and at least a first and a second restoring check valve 16, 16a each check valve 16 or 16a provided in between each hydraulic oil distributing conduit 13 or 13a and each hydraulic oil delivery conduit 12 or 12a for returning the hydraulic oil from the wheel cylinders 14 or 14a into the master cylinder 1 upon releasing of the brake pedal 11 when not for braking purpose.

The multi-pass rotary valve 2 includes: a housing 21 confining a rotor chamber 20 in the housing 21, a rotor 24 rotatably mounted in the rotor chamber 20 and having a plurality of thrusting cavities 26 circumferentially recessed in the rotor 24, a plurality of blade portions 27 generally radially formed on the rotor 24 each blade portion 27 separating every two neighbouring thrusting cavities 26, at least an input port 22 formed on the housing 21 of the valve 2 and communicating with the hydraulic oil delivery conduit 12 for directing the hydraulic oil into each thrusting cavity 26 in the rotor 24 for thrusting the rotor 24 for its rotation, at least a braking outlet 23 formed on the housing 21 of the valve 2 and communicating with the hydraulic oil distributing conduit 13 for delivering the hydraulic oil to the wheel cylinders 14 for braking vehicle wheels, and at least a returning port 25 formed on the housing 21 of the valve 2 and communicating with the hydraulic oil returning conduit 15 for returning the hydraulic oil to the expansion-cylinder 40, with each thrusting cavity 26 rotatably alternatively confining and communicating the input port 22 and the braking outlet 23 preliminarily for delivering the hydraulic oil from the delivery conduit 12 to the distributing conduit 13 for wheel braking purpose; and confining and communicating the braking outlet 23 and the returning port 25 secondarily for returning the hydraulic oil from the distributing conduit 13 to the returning conduit 15 for returning the hydraulic oil into the expansion-cylinder 40.

Figure 4:
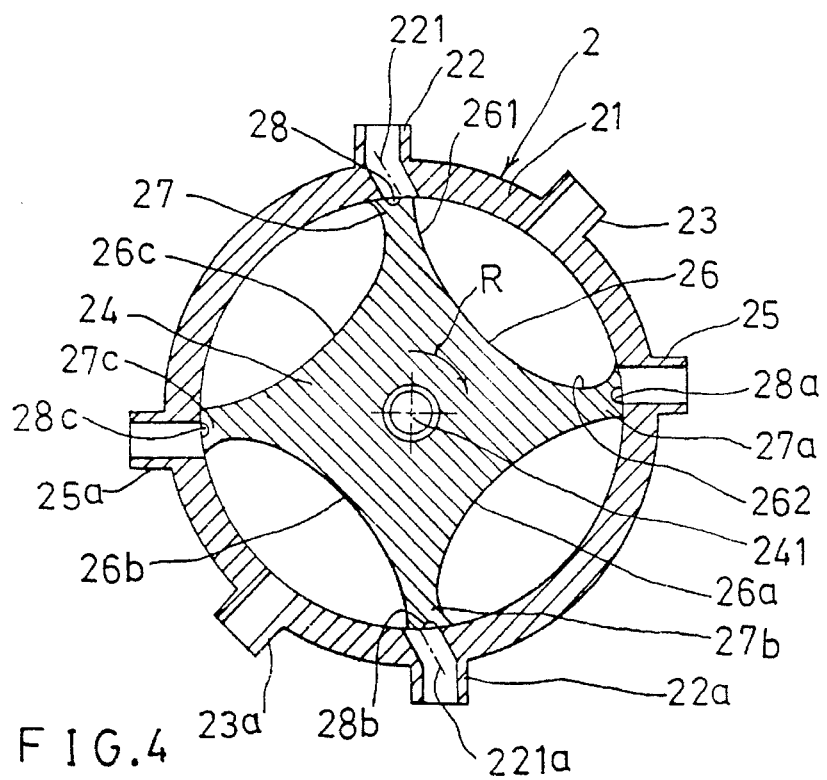
FIG. 4 is a cross-sectional drawing of the valve as viewed from 4—4 direction of FIG. 3.
Figure 5:
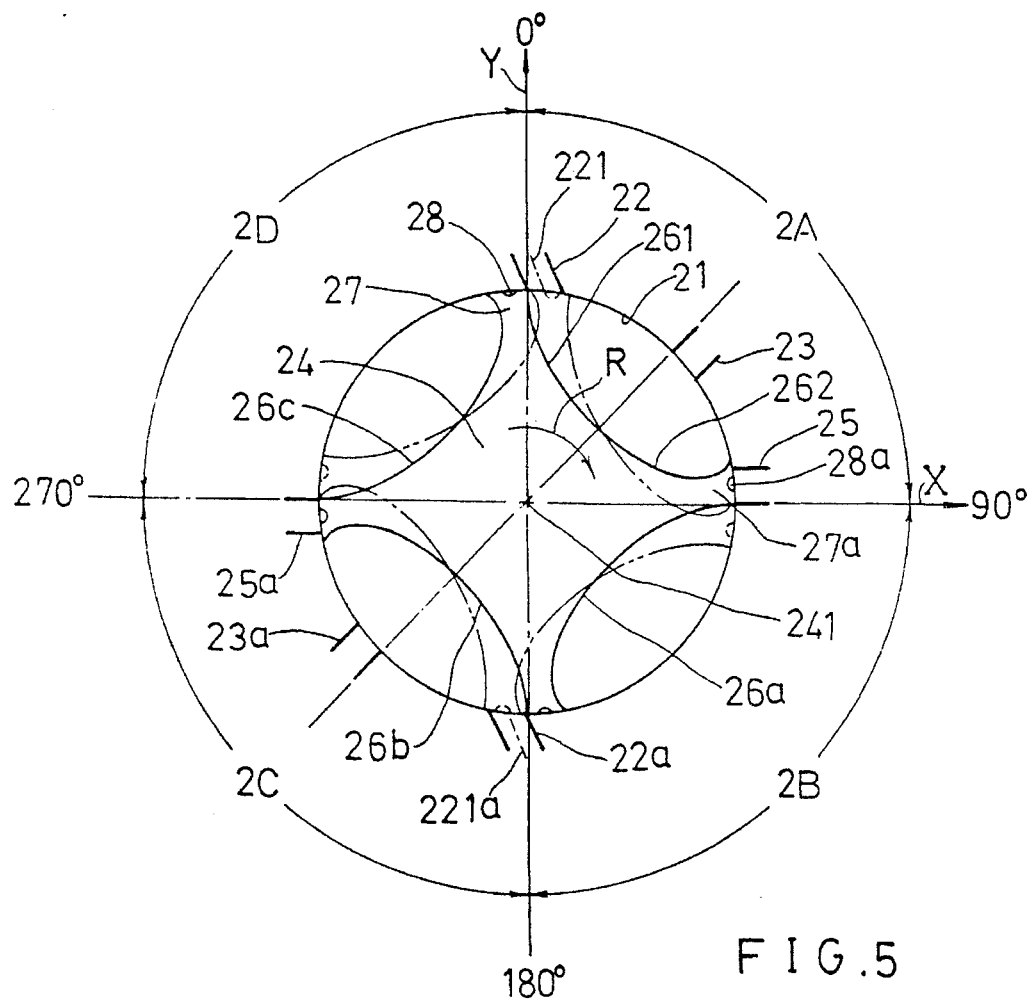
FIG. 5 is an illustration showing a basic relationship between a rotor and a housing of the multi-pass rotary valve of the present invention.
Figure 6:
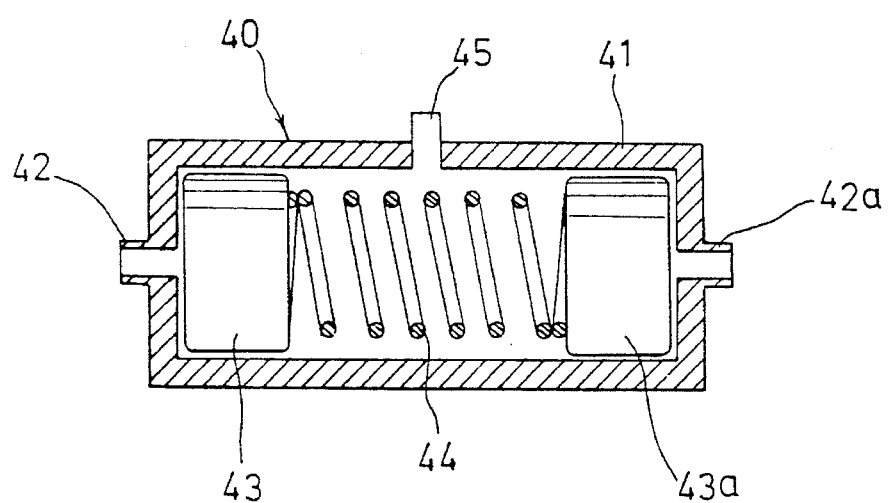
FIG. 6 is a sectional drawing of an expansion-cylinder of the present invention.

The rotor 24 rotatably mounted in the housing 21 of the multi-pass rotary valve 2 about a rotating axis 241 longitudinally secured in the housing 21 includes: four thrusting cavities 26, 26a, 26b and 26c circumferentially recessed in the rotor 24 each thrusting cavity generally parabolic shaped having a shallow recess portion 261 adjacent to a first blade portion 27 and a deep recess portion 262 continously arcuate shaped from the shallow recess portion 261 towards a second blade portion 27a neighbouring the first blade portion 27; and four blade portions 27, 27a, 27b and 27c generally spirally formed about the rotating axis 241 of the rotor 24 with each blade portion 27 separating every two neighbouring thrusting cavities 26; and four small recesses 28, 28a, 28b and 28c formed on the circumference face of each blade portions 27, 27a, 27b and 27c; and the input port 22 and the returning port 25 confined in a quadrant 2A of a rotating circle of 360 degrees of the rotor chamber 20 of the valve 2 as shown in FIGS. 5 and 4 with the braking outlet 23 generally formed in a central portion between the input port 22 and the returning port 25, and with the input port 22 disposed about an input axis 221 inclinedly intersecting a cylindrical wall of the rotor chamber 20 to be operatively extrapolatively tangential to the recess portions 261, 262 parabolic shaped as shown in full line of FIG. 5 when a first blade portion 27 is started at a zero degree (0°) of the rotating circle, thereby primarily communicating the input port 22 with the braking outlet 23 by each thrusting cavity 26 and blocking the returning port 25 by a second blade portion 27a (full line in FIG. 5); and secondarily communicating the braking outlet 23 and the returning port 25 by the thrusting cavity and blocking the input port 22 by the first blade portion 27 (dotted line in FIG. 5), for intermittently braking and releasing of the wheel cylinders 14 for anti-locking purpose.

The multi-pass rotary valve 2 has a first input port 22, a first braking outlet 23 and a first returning port 25 defined in a first quadrant 2A of a 360 degree rotating circle having the first, second, third and fourth quadrants 2A, 2B, 2C and 2D defined within an ordinate y and an abscissa x in the rotor chamber 20 with the first input port 22 starting from zero degree of the rotating circle of the rotor chamber 20, with the first braking outlet 23 starting from 45 degrees of the rotating circle of the rotor chamber 20, with the first returning port 25 terminating at 90 degrees of the rotor chamber 20, and with a first input axis 221 of the first input port 22 inclinedly protruding rightwardly downwardly in the first quadrant 2A (FIG. 5) to be operatively tangential to one thrusting cavity 26 of parabolic shape when the rotor 24 is rotated clockwise (R) from a right side 2A, 2B of the rotor chamber towards a left side 2C, 2D of the chamber 20; and a second input port 22a, a second braking outlet 23a, and a second returning port 25a defined in the third quadrant 2C of the rotating circle of the rotor chamber 20 with the second input port 22a starting from 180 degrees of the rotating circle, with the second braking outlet 23a starting from 225 degrees of the rotating circle, with the second returning port 25a terminating at 270 degrees of the rotating circle, and with a second input axis 221a of the second input port 22a inclinedly protruding leftwardly upwardly in the third quadrant 2C to be operatively tangential to another thrusting cavity 26b opposite to the first input axis 221, whereby upon treading of a brake pedal 11 of the master cylinder 1 and upon a clockwise rotation of the rotor 24 for first communicating the first input port 22 and the first braking outlet 23 and for communicating the second input port 22a and the second braking outlet 23a, the hydraulic oil will be delivered from a first and a second delivery conduit 12, 12a towards a first and a second distributing conduit 13, 13a and front and rear wheel cylinders 14, 14a for braking vehicle front and rear wheels; and upon continuing treading of the pedal 11 and the rotation of the rotor 24 for secondly communicating the first braking outlet 23 and the first returning port 25 and for communicating the second braking outlet 23a and the second returning port 25a, the hydraulic oil will be returned into the expansion-cylinder 40 from a first and second distributing conduit 13,13a and through a first and second returning conduit 15, 15a for releasing braking of the vehicle front and rear wheels for anti-locking purpose.

The expansion-cylinder 40 includes: a cylinder 41 having two oil inlet connectors 42 and 42a mounted at each end portion of the cylinder body, two equal size pistons 43, 43a reciprocating in the cylinder 41 and each piston 43 or 43a having a length of the piston longer than ¼ length of the cylinder 41, a tension spring 44 provided between two pistons 43 and 43a normally urging the pistons 43 and 43a toward the both end portions of the cylinder 41, and an air outlet 45 mounted at the middle portion of the cylinder 41.

Figure 7:
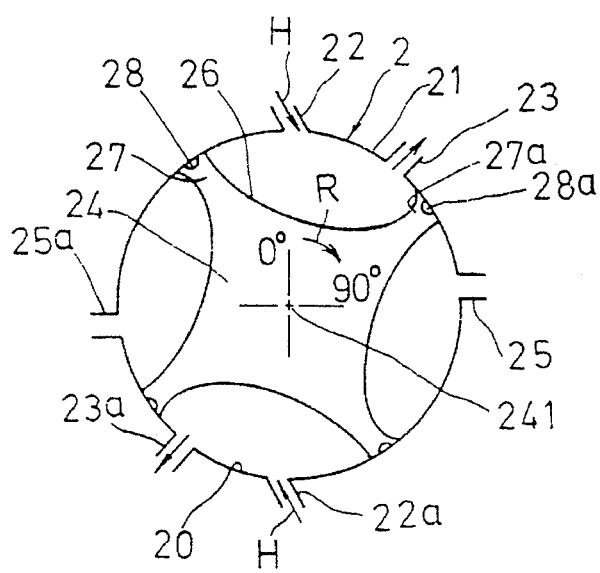
FIG. 7 shows a first step of a rotating operation mode of the multi-pass rotary valve in accordance with the present invention.
Figure 8:
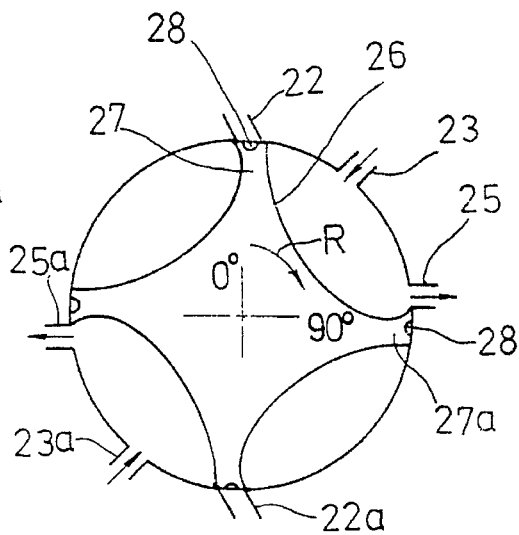
FIG. 8 shows a second step of the operation of the valve following FIG. 7.
Figure 9:
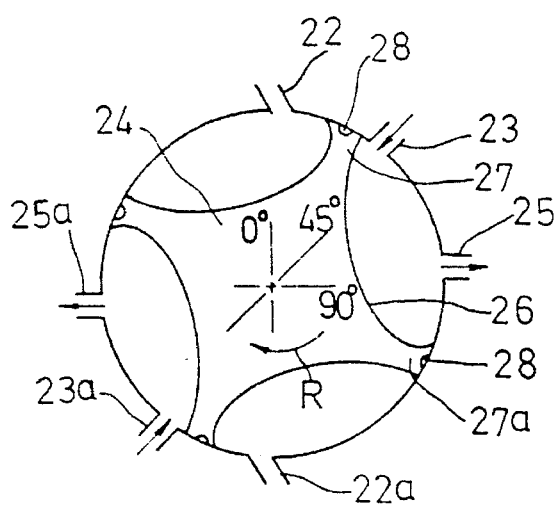
FIG. 9 shows a third operation step of the valve of the present invention following FIG. 8.
Figure 10:
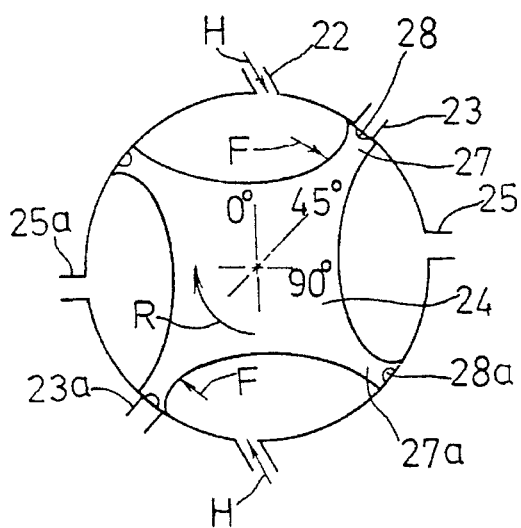
FIG. 10 shows a fourth operation of the valve following FIG. 9.

The operating sequence for braking and releasing vehicle wheels may be further illustrated in FIGS. 7–10, in which: FIG. 7 shows a communication between input port 22 and braking outlet 23 and communication between port 22a and outlet 23a, but blocking the returning port 25, 25a for delivering hydraulic oil H for braking purpose; FIG. 8 shows a communication between braking outlet 23 and returning port 25 and communication between outlet 23a and returning port 25a, but blocking the input ports 22, 22a, for releasing the braking of the wheel cylinders 14, 14a for anti-locking purpose; FIG. 9 shows a continuing releasing situation as rotating from that of FIG. 8, but opening the input ports 22,22a; and FIG. 10 shows a thrusting force F as effected by the hydraulic oil H from the input ports 22, 22a for rotating the rotor 24 clockwise for the delivery of hydraulic oil for braking purpose when repeating the operation cycle from FIG. 10 to FIG. 7.

Figure 2:
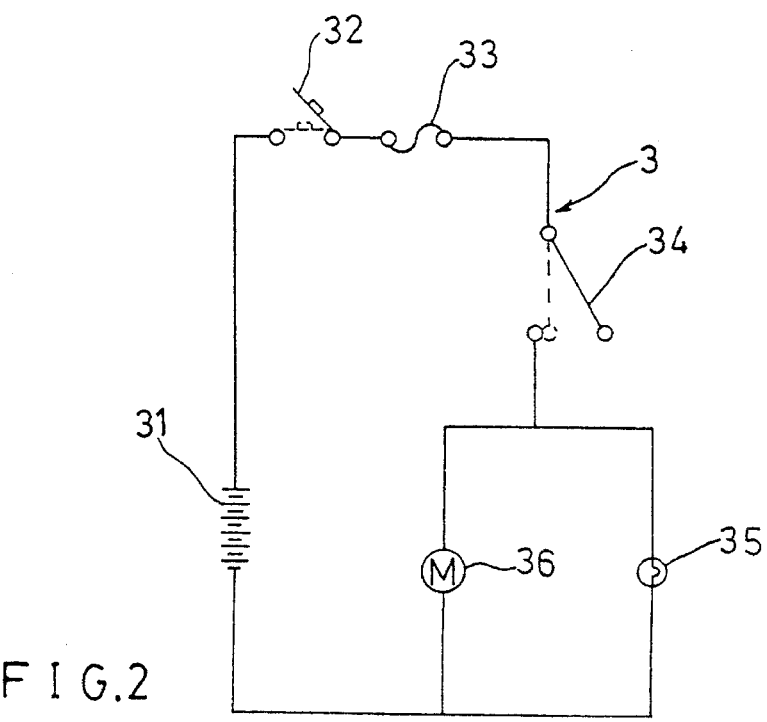
FIG. 2 shows an electrical driving circuit of the present invention.
Figure 3:
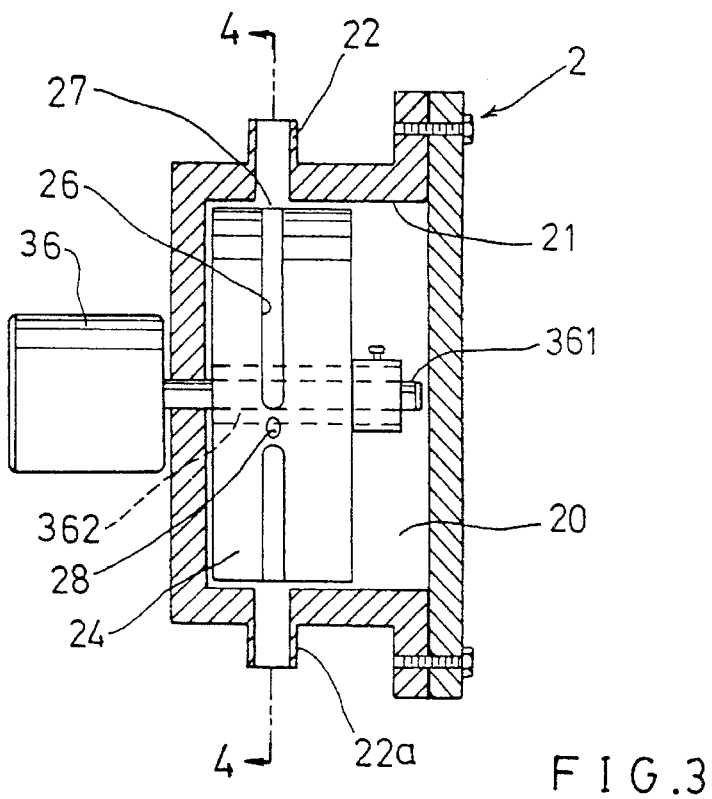
FIG. 3 is a sectional drawing of a multi-pass rotary valve of the present invention.

The electrical driving circuit 3 as shown in FIG. 2 includes: a power source 31 which may be supplied from a car battery, a main switch 32 and a fuse 33 connected in the driving circuit 3, a starting switch 34 normally switching off the driving circuit 3 as urged by a brake pedal 11 of the brake master cylinder 1 when not in braking operation and operatively switching on the driving circuit 3 when treading the pedal 11 for braking purpose, an indicator lamp 35 operatively lit on when the starting switch 34 is actuated for braking operation, and a driving motor 36 electrically connected to the power source 31 and on-off controlled by the starting switch 34, having a motor shaft 361 axially connected with the rotor 24 of the valve 2 by aligning an axis of the motor shaft 361 with the rotating axis 241 of the rotor 24 and a ratchet wheel means 362 secured with the motor shaft 361 for forwardly rotating the rotor 24 in a clockwise direction R for a circulatively sequential rotation of the rotor in a first, second, third and fourth quadrant 2A, 2B, 2C and 2D, and so on, and preventing a counter clockwise rotation of the rotor 24 for ensuring a smooth intermittent braking and releasing operation of the braking system 100 of the present invention.

The width of blade portion 27 is designed to be double of the diameter of the inlet port 22 and outlet port 25 that the blade portion 27a will interrupt the hydraulic oil flowing out through the outlet port 25 before the blade portion 27 interrupting hydraulic oil flowing into the thrusting cavity 26.

The small recess 28 on the circumference face of the blade portion 27 will lead the high pressure hydraulic oil producing an extrapoluting tangential force to push the blade portion 27 away from the inlet port 22 to let the hydraulic oil flowing from the inlet port 22 to the outlet port 23 for braking purpose upon treading of brake pedal 11 if the driving motor 35 is out of order.

By an experimentation showing the braking hydraulic oil pressure will be higher than 150 Kgs/cm$^2$ when treading of brake pedal of a vehicle in an emergency situation, a pressure value of 100 Kgs/cm$^2$ will lock the wheels when the vehicle speed at 40 Kms/hr., but would not lock it at 100 Kms/hr., a pressure value of 120 Kgs/cm$^2$ will lock the wheels when the vehicle speed at 50 Kms/hr., but would not lock it at 110 Kms/hr.. Therefore, suitable resilience of the tension spring 44 of the expansion-cylinder 40 would be selected by the test result to meet the requirement to let the hydraulic oil return into the expansion-cylinder 40 through the multi-pass rotary valve 2 from wheel cylinder 14 for intermittent purpose, and let the hydraulic oil feedback from the expansion-cylinder 40 to the wheel cylinder 14 to brake the wheels when the vehicle stop even the rotor 24 of the multi-pass rotary valve 2 turning for safety purpose.

The present invention may be served for intermittently braking and releasing vehicle wheels for anti-locking purpose with simplified structure and reduced production cost to be superior to a conventional breaking apparatus.

I claim:

1. A braking apparatus comprising:

a braking system (100) including a brake master cylinder (1) for delivering hydraulic oil for braking purpose upon treading of a brake pedal (11) pivotally mounted in a vehicle;

a plurality of wheel cylinders (14, 14a) for a plurality of front and rear wheels of the vehicle for braking the wheels by the hydraulic oil delivered from said master cylinder (1) as controlled by a multi-pass rotary valve (2) and an expansion-cylinder (40); and said multi-pass rotary valve (2) having a rotor (24) rotatably mounted in said rotary valve (2) for alternatively delivering and interrupting the hydraulic oil from said master cylinder (1) to said wheel cylinders (14, 14a) for intermittently braking and releasing the wheels for anti-locking purpose, and said rotor (24) driven by a driving motor (36) of an electrical driving circuit (3) including: a power source (31), a starting switch (34) normally switching off the driving circuit (3) as urged by said brake pedal (11) of said brake master cylinder (1) of said braking system when not in braking operation and operatively switching on the driving circuit (3) when treading the pedal (11) for braking purpose, an indicator lamp (35) operatively lit on when the starting switch (34) is actuated for braking operation, and said driving motor (36) electrically connected to the power source (31) and controlled by the starting switch (34) for on and off operation of said motor, and a motor shaft (361) axially connected with the rotor (24) of the valve (2) by aligning an axis of the motor shaft (361) with a rotating axis (241) of the rotor (24);

the improvement which comprises:

said multi-pass rotary valve (2) including: a housing (21) confining a rotor chamber (20) in the housing (21), the rotor (24) rotatably mounted in the rotor chamber (20) and having a plurality of thrusting cavities (26, 26a, 26b, 26c) circumferentially recessed in the rotor (24), a plurality of blade portions (27, 27a, 27b, 27c) generally radially formed on the rotor (24) each blade portion separating every two neighboring thrusting cavities (26), a first and a second input port (22, 22a) formed on the housing (21) of the valve (2) and communicating with a hydraulic oil delivery conduit (12) for directing the hydraulic oil into each thrusting cavity in the rotor (24) for thrusting the rotor (24) for its rotation, a first and a second braking outlet (23, 23a) formed on the housing (21) of the valve (2) and communicating with the hydraulic oil distributing conduit (13) for delivering the hydraulic oil to the wheel cylinders (14, 14a) for braking vehicle wheels, and a first and a second returning port (25, 25a) formed on the housing (21) of the valve (2) and communicating with the hydraulic oil returning conduit (15) for returning the hydraulic oil to the expansion-cylinder (40), with each said thrusting cavity rotatably alternatively confining and communicating each said input port and each said braking outlet preliminarily for delivering the hydraulic oil from the delivery conduit (12) to the distributing conduit (13) for wheel braking purpose; and confining and communicating each said braking outlet (23) and each said returning port (25) secondarily for returning the hydraulic oil from the distributing conduit (13) to the returning conduit (15) for returning the hydraulic oil into the expansion-cylinder (40); and said rotor (24) having four blade portions (27, 27a, 27b and 27c) radially formed on said rotor (24) and rotatably mounted in the housing (21) of the multi-pass rotary valve (2) about said rotating axis (241) longitudinally secured in the housing (21), and including: a first, second, third and fourth thrusting cavity (26), (26a), (26b) and (26c) circumferentially recessed in the rotor (24) each said thrusting cavity generally parabolic shaped having a shallow recess portion (261) adjacent to a first blade portion (27) and a deep recess portion (262) continuously arcuate shaped from the shallow recess portion (261) towards a second blade portion (27a) neighbouring the first blade portion (27); and said four blade portions (27), (27a), (27b) and (27c) generally spirally formed about the rotating axis (241) of the rotor (24) with each blade portion separating every two neighbouring thrusting cavities; and four small recesses (28), (28a), (28b) and (28c) formed on the circumference face of each said blade portion (27), (27a), (27b) and (27c); and each said input port and each said returning port confined in each quadrant of a rotating circle of 360 degrees of the rotor chamber (20) of the valve (2) with each said braking outlet generally disposed in a central portion between each said input port and each said returning port, and with each said input port disposed about an input axis inclinedly intersecting a cylindrical wall of the rotor chamber (20) to be operatively extrapolatively tangential to the recess portions parabolic shaped when each said blade portion is started at a zero degree of each quadrant of the rotating circle, thereby primarily communicating one said input port with one said braking outlet by one said thrusting cavity and blocking one said returning port by one said blade portion; and secondarily communicating one said braking outlet and one said returning port by one said thrusting cavity and blocking one said input port by one said blade portion, for intermittently braking and releasing of the wheel cylinders (14, 14a) for anti-locking purpose.

2. (amended) A braking apparatus according to claim 1, wherein said multi-pass rotary valve (2) has said first input port (22), said first braking outlet (23) and said first returning port (25) defined in a first quadrant (2A) of a 360 degree rotating circle having the first, second, third and fourth quadrants (2A), (2B), (2C) and (2D) defined within an ordinate (Y) and an abscissa (X) in the rotor chamber (20) with the first input port (22) starting from zero degree of the rotating circle of the rotor chamber (20), with the first braking outlet (23) starting from 45 degree of the rotating circle of the rotor chamber (20), with the first returning port (25) terminating at 90 degree of the rotor chamber (20), and with a first input axis (221) of the first input port (22) inclinedly protruding rightwardly downwardly in the first quadrant (2A) to be operatively tangential to said first thrusting cavity (26) of parabolic shape when the rotor (24)

is rotated clockwise (R) from a right side (2A), (2B) of the rotor chamber towards a left side (2C), (2D) of the chamber (20); and said second input port (22a), said second braking outlet (23a), and said second returning port (25a) defined in the third quadrant (2C) of the rotating circle of the rotor chamber (20) with the second input port (22a) starting from 180 degree of the rotating circle, with the second braking outlet (23a) starting from 225 degree of the rotating circle, with the second returning port (25a) terminating at 270 degree of the rotating circle, and with a second input axis (221a) of the second input port (22a) inclinedly protruding leftwardly upwardly in the third quadrant (2C) to be operatively tangential to said third thrusting cavity (26b) opposite to the first input axis (221), whereby upon treading of said brake pedal (11) of the master cylinder (1) and upon a clockwise rotation of the rotor (24) for first communicating the first input port (22) and the first braking outlet (23) and for communicating the second input port (22a) and the second braking outlet (23a), the hydraulic oil will be delivered from a first and a second delivery conduit (12), (12a) towards a first and a second distributing conduit (13), (13a) and front and rear wheel cylinders (14), (14a) for braking vehicle front and read wheels; and upon continuing treading of the pedal (11) and the rotation of the rotor (24) for secondly communicating the first braking outlet (23) and the first returning port (25) and for communicating the second braking outlet (23a) and the second returning port (25a), the hydraulic oil will be returned into the expansion-cylinder (40) from a first and second returning conduit (15), (15a) for releasing braking of the vehicle front and rear wheels for anti-locking purpose;

and a ratchet wheel means (362) secured with the motor shaft (361) for forwardly rotating the rotor (24) in a clockwise direction (R) for a circulatively sequential rotation of the rotor in a first, second, third and fourth quadrant (2A), (2B), (2C) and (2D), and preventing a counter clockwise rotation of the rotor (24) for ensuring a smooth intermittent braking and releasing operation of the braking system (100).

3. A braking apparatus according to claim 1, wherein said expansion-cylinder (40) includes: a cylinder (41) having two oil inlet connectors (42) and (42a) mounted at each end portion of the cylinder body, two equal size pistons (43) and (43a) reciprocating in the cylinder (41) and each piston (43) or (43a) having a length longer than ¼ length of the cylinder (41), a tension spring (44) provided between two pistons (43) and (43a) normally urging the pistons (43) and (43a) towards two opposite end portions of the cylinder (41), and an air outlet (45) mounted at the middle portion of the cylinder (41).

* * * * *